(12) United States Patent
Yang et al.

(10) Patent No.: US 11,073,970 B2
(45) Date of Patent: Jul. 27, 2021

(54) DASHBOARD GENERATION BASED ON USER INTERACTION

(71) Applicant: International Business Machines Corporation, Armonk, NY (US)

(72) Inventors: Naijun Yang, New York, NY (US); James V. Clements, Austin, TX (US); Ryan D. Helmoski, Austin, TX (US); Michael J. Casper, Gretna, NE (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/672,024

(22) Filed: Nov. 1, 2019

(65) Prior Publication Data
US 2020/0064988 A1 Feb. 27, 2020

Related U.S. Application Data

(63) Continuation of application No. 15/648,836, filed on Jul. 13, 2017, now Pat. No. 10,521,090.

(51) Int. Cl.
| | |
|---|---|
| *G06F 3/00* | (2006.01) |
| *G06F 3/0484* | (2013.01) |
| *G06N 7/00* | (2006.01) |
| *H04L 29/08* | (2006.01) |
| *G06F 3/0481* | (2013.01) |
| *G06F 3/01* | (2006.01) |

(52) U.S. Cl.
CPC ........ *G06F 3/04842* (2013.01); *G06F 3/0481* (2013.01); *G06N 7/00* (2013.01); *H04L 67/36* (2013.01); *H04L 67/22* (2013.01)

(58) Field of Classification Search
CPC .................................................. G06F 3/04842
See application file for complete search history.

(56) References Cited

U.S. PATENT DOCUMENTS

| | | |
|---|---|---|
| 6,452,617 B1 | 9/2002 | Bates et al. |
| 6,526,479 B2 | 2/2003 | Rosenzweig |
| 6,744,452 B1 | 6/2004 | McBrearty et al. |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Nicholas Augustine
(74) *Attorney, Agent, or Firm* — Robert J. Shatto

(57) ABSTRACT

Provided is a method for automatically identifying a long loading time for a user selection. An initial user input against a selection element for an application running on an electronic device is received. The initial user input is transmitted to a server for processing the initial user input. One or more additional user inputs are received after the server has begun processing the initial user input. Statistical analysis techniques are utilized to determine a selection attempt value. The selection attempt value is compared to a predetermined retry rate criteria. The selection attempt value is determined to satisfy a threshold. An action is performed in response to determining that the selection attempt value satisfies the threshold.

18 Claims, 8 Drawing Sheets

(56) References Cited

U.S. PATENT DOCUMENTS

| | | | |
|---|---|---|---|
| 9,009,544 B2 * | 4/2015 | Cook | G06F 11/0706 |
| | | | 714/48 |
| 9,087,154 B1 * | 7/2015 | Seibert, Jr. | G06F 11/3612 |
| 9,335,905 B1 | 5/2016 | Ainslie et al. | |
| 9,654,546 B1 * | 5/2017 | Narsude | G06F 11/1402 |
| 9,710,122 B1 * | 7/2017 | Pillay | G06F 11/0784 |
| 9,740,381 B1 | 8/2017 | Chaudhri et al. | |
| 9,753,796 B2 | 9/2017 | Mahaffey et al. | |
| 9,946,625 B2 * | 4/2018 | Klein | G06F 11/3664 |
| 10,031,652 B1 | 7/2018 | Yang et al. | |
| 10,168,877 B1 | 1/2019 | Yang et al. | |
| 10,168,878 B1 | 1/2019 | Yang et al. | |
| 2005/0135267 A1 | 6/2005 | Galbraith et al. | |
| 2005/0160335 A1 | 7/2005 | Peterson | |
| 2008/0168367 A1 | 7/2008 | Chaudhri et al. | |
| 2009/0276771 A1 | 11/2009 | Nickolov et al. | |
| 2011/0242032 A1 * | 10/2011 | Seo | G06F 3/04886 |
| | | | 345/173 |
| 2011/0271149 A1 * | 11/2011 | Roussel | G06F 11/321 |
| | | | 714/46 |
| 2011/0302234 A1 | 12/2011 | Monk, IV et al. | |
| 2014/0111487 A1 * | 4/2014 | Wang | G06F 3/04186 |
| | | | 345/178 |
| 2014/0123060 A1 * | 5/2014 | Kuscher | G06F 3/04842 |
| | | | 715/800 |
| 2014/0228077 A1 * | 8/2014 | Xu | H04M 1/0266 |
| | | | 455/566 |
| 2014/0289617 A1 * | 9/2014 | Rajagopalan | G06F 40/166 |
| | | | 715/256 |
| 2014/0372947 A1 * | 12/2014 | Hill | G06F 3/0488 |
| | | | 715/815 |
| 2015/0067527 A1 * | 3/2015 | Gardner | G06F 3/0482 |
| | | | 715/739 |
| 2015/0205480 A1 * | 7/2015 | Loganathan | G06F 8/38 |
| | | | 715/765 |
| 2016/0350439 A1 | 12/2016 | Monk, IV et al. | |
| 2018/0262360 A1 * | 9/2018 | Przybylski | F24F 11/52 |
| 2019/0018573 A1 | 1/2019 | Yang et al. | |

OTHER PUBLICATIONS

Accelerated Examination Support Document, U.S. Appl. No. 15/703,654, signed Aug. 25, 2017, 18 pgs.

Accelerated Examination Support Document, U.S. Appl. No. 15/988,090, signed May 16, 2018, 27 pgs.

Accelerated Examination Support Document, U.S. Appl. No. 15/988,120, signed Jun. 29, 2018, 26 pgs.

List of IBM Patents or Patent Applications Treated as Related, Oct. 30, 2019, 2 pgs.

\* cited by examiner

DASHBOARD GENERATION BASED ON USER INTERACTION

BACKGROUND

The present invention relates generally to the field of data processing, and more particularly to software development and management.

A software development kit (SDK) is a set of software development tools that are designed to allow a user to create an application for a software package, software framework, hardware platform, computer system, video game console, operating system, or similar development platform. The SDK can include functionality designed to fit a user's needs so that the user experience is enhanced. The SDKs may also be created to include more room within an application that allows for advertisements and advanced functionalities. Some SDKs are specific to a particular type of software or hardware, and may require a certain type of computer programming language as input. SDKs may also be deployed within an application that allows data analytics to be performed by the SDK on any user activity within the application.

SUMMARY

Embodiments of the present disclosure include a method, computer program product, and system for automatically identifying a long loading time for a user selection. An initial user input against a selection element for an application running on an electronic device is received. The initial user input is transmitted to a server for processing the initial user input. One or more additional user inputs are received after the server has begun processing the initial user input. Statistical analysis techniques are utilized to determine a selection attempt value. The selection attempt value is compared to a predetermined retry rate criteria. The selection attempt value is determined to satisfy a threshold. An action is performed in response to determining that the selection attempt value satisfies the threshold.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
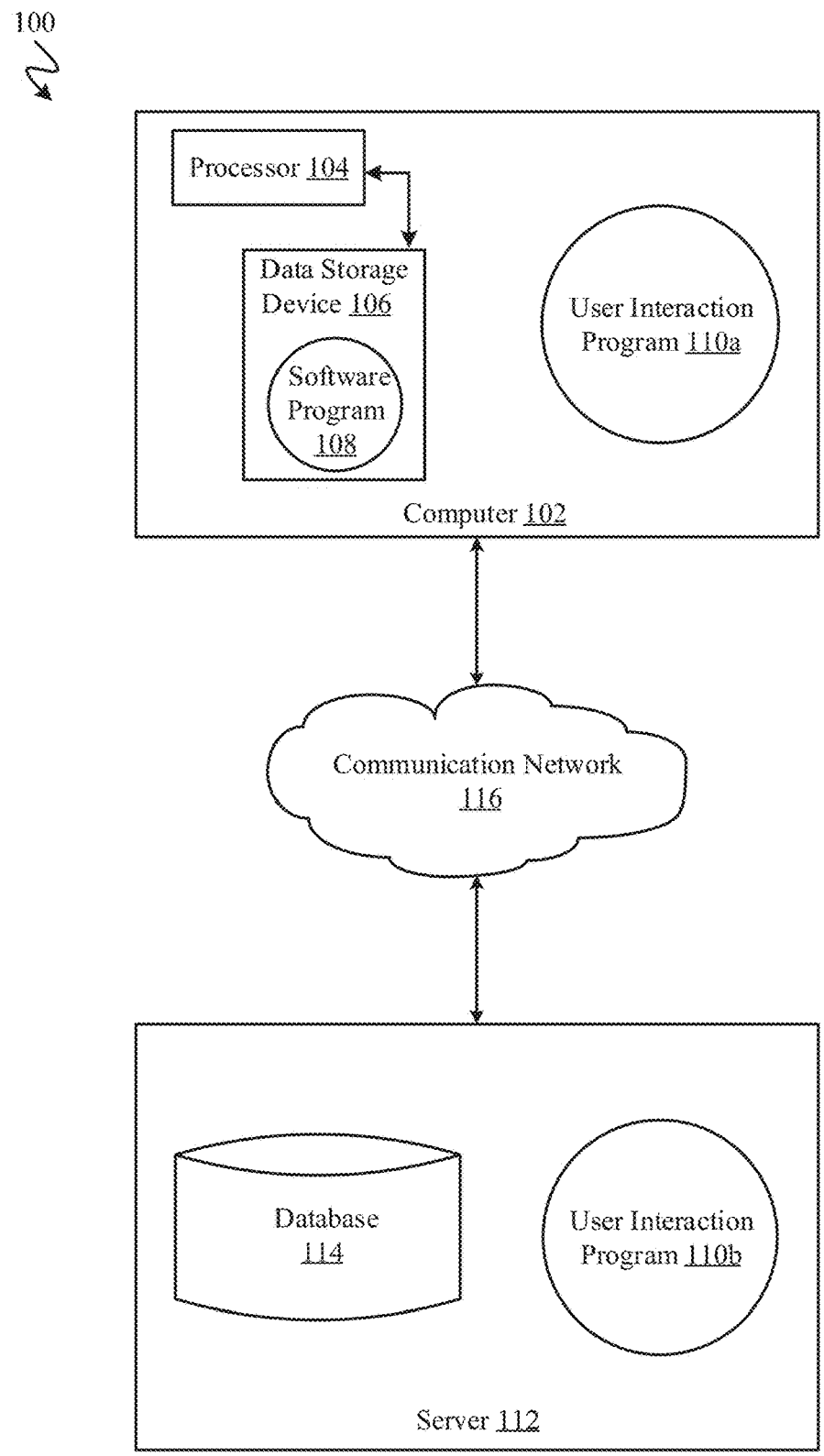
FIG. 1 illustrates a networked computer environment, according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In order to stay competitive in the digital world and retain customer loyalty, application owners need to continuously make customer experience improvements on their mobile and/or desktop applications. However, the current process for identifying areas of improvement and implementing the solutions is time-consuming and resource-intensive. Application owners track a variety of data sources on a daily basis, but secondary sources such as application reviews are difficult to find, and the majority of application reviews do not offer actionable feedback. Primary research such as user interviews takes a long time to complete, and are expensive to conduct. Furthermore, in order to deploy improvements to user experience, application owners rely on development teams who are often resource constrained, meaning improvements in user interactions are often delayed.

Therefore, it may be advantageous to provide a method for a full-service tool that can provide immediate and actionable feedback on user behavior. Embodiments of the present disclosure may first provide fast and actionable feedback to application owners giving them immediate and easy-to-understand user-interaction behavior data, and may then utilize intelligent analytics to detect and alert application owners to user experience issues. Additionally, as a holistic solution, aspects of the present disclosure may influence application owners to make rapid changes to fix negative user interactions, with minimal developer resources needed.

Moreover, an automatic action may be performed that reconfigures an application, in response to a user selecting an element a certain number of times. For example, if users routinely over click when performing a certain action (like try to load a specific page or part of the application, or connect to a specific server), aspects of the present disclosure could preemptively show the notification after the first click and send an indication to the application owner that there may be a problem with that link and/or action. Additionally, a user selecting an application multiple times before the application loads (e.g., by clicking multiple times) often restarts the processing, both by the application and by the server. This wastes processing time, resources, and energy, thereby taking resources away from the server to process requests from other users and/or applications. Further, because the multiple clicks increase communication between the application and server, this increases network traffic. Accordingly, embodiments of the GUI improve the processing speed, reduce wasted processing time, and memory for both the mobile device and the server, and reduce network traffic. In addition, embodiments of the GUI can deactivate the selected element that the user is repeatedly attempting to select for a specified period of time. Other elements can remain active, and there could be an override option, allowing an application developer or user to remove the automatic deactivation of the selected element. This can further save processing/memory/network traffic.

Aspects of the present disclosure can track actual user interaction data to determine negative behaviors, providing primary sources of information on user behavior. Using statistical analysis, user experience issues may be identified and then brought to the attention of the application owner. The statistical analysis may be presented in a visually clean and easy to comprehend manner, helping the application owners to take immediate action. Configuration panels (e.g., a digital dashboard in the form of a graphical user interface) that allows application owners to make UI changes on their own without waiting for resources and assistance from their development team may be generated and then transmitted to the application owner for the application owner to create a digital message, notifying the user that the server is processing the request.

One common mobile-application user-interface problem is multiple clicks on a button due to load times that are longer than a user's expectations. When a user clicks on a button and has to wait an amount of time, longer than his/her expectations on how long the load time should be, a user will assume that the button is not working. He/she will become frustrated, and click on the button several times because he/she is not sure if the mobile and/or desktop application registered the first click. This creates frustration for the user, because he/she may not know if their original click has been registered by the mobile application, or if he/she needs to click on it several more times.

A time lapse between a first action click (an initial user input) and an immediate server response, and the time of the second button click (additional user input) may be monitored and recorded in a data repository. If there is an abnormal (predetermined) amount of button clicks (additional user input) between the start of server processing the initial user input and the rendering of the page, then it can determined that the user may not know that the server is processing their request. In that case, the user interface may be automatically changed so that a loading icon is added to inform the mobile application user that their previous click was registered by the server, and that the server is processing the initial user input. This may lead to decreased user confusion and frustration.

It is to be understood that the aforementioned advantages are example advantages and should not be construed as limiting. Embodiments of the present disclosure can contain all, some, or none of the aforementioned advantages while remaining within the spirit and scope of the present disclosure.

Referring to FIG. 1, an exemplary networked computer environment 100 in accordance with at least one embodiment is depicted. The networked computer environment 100 may include a computer 102 with a processor 104 and a data storage device 106 that is enabled to run a software program 108 and a user interaction program 110a. The networked computer environment 100 may also include a server 112 that is enabled to run a user interaction program 110b that may interact with a database 114 and a communication network 116. The networked computer environment 100 may include one or more computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the user interaction program 110a, 110b may interact with a database 114 that may be embedded in various storage devices, such as, but not limited to a computer/mobile device 102, a networked server 112, or a cloud storage service. The database 114 can include a repository of any transactions associated or initiated with the user interaction program 110a and 110b. The user interaction program 110a and 110b may be updated in any system associated with the user interaction program 110a and 110b (e.g., database 114), and may also be a software development kit (SDK) downloadable to the client computer 102 and/or the server 112, that may be able to be updated upon a user's request or automatically.

According to some embodiments, a client computer 102 or a server computer 112 may use the user interaction program 110a, 110b (respectively) to receive user input, such as a selection of an application, transmit the received selection to server 112, record the user input in database 114, receive additional user input while the server is processing the received user input, record the additional user input in database 114, perform statistical analysis on all received user input, and then compare the statistical analysis to an acceptable retry rate criteria, determine that the comparison satisfies a threshold, and then perform an action based on the comparison. The user interaction method is explained in more detail below with respect to FIGS. 2 and 3.

Figure 2:
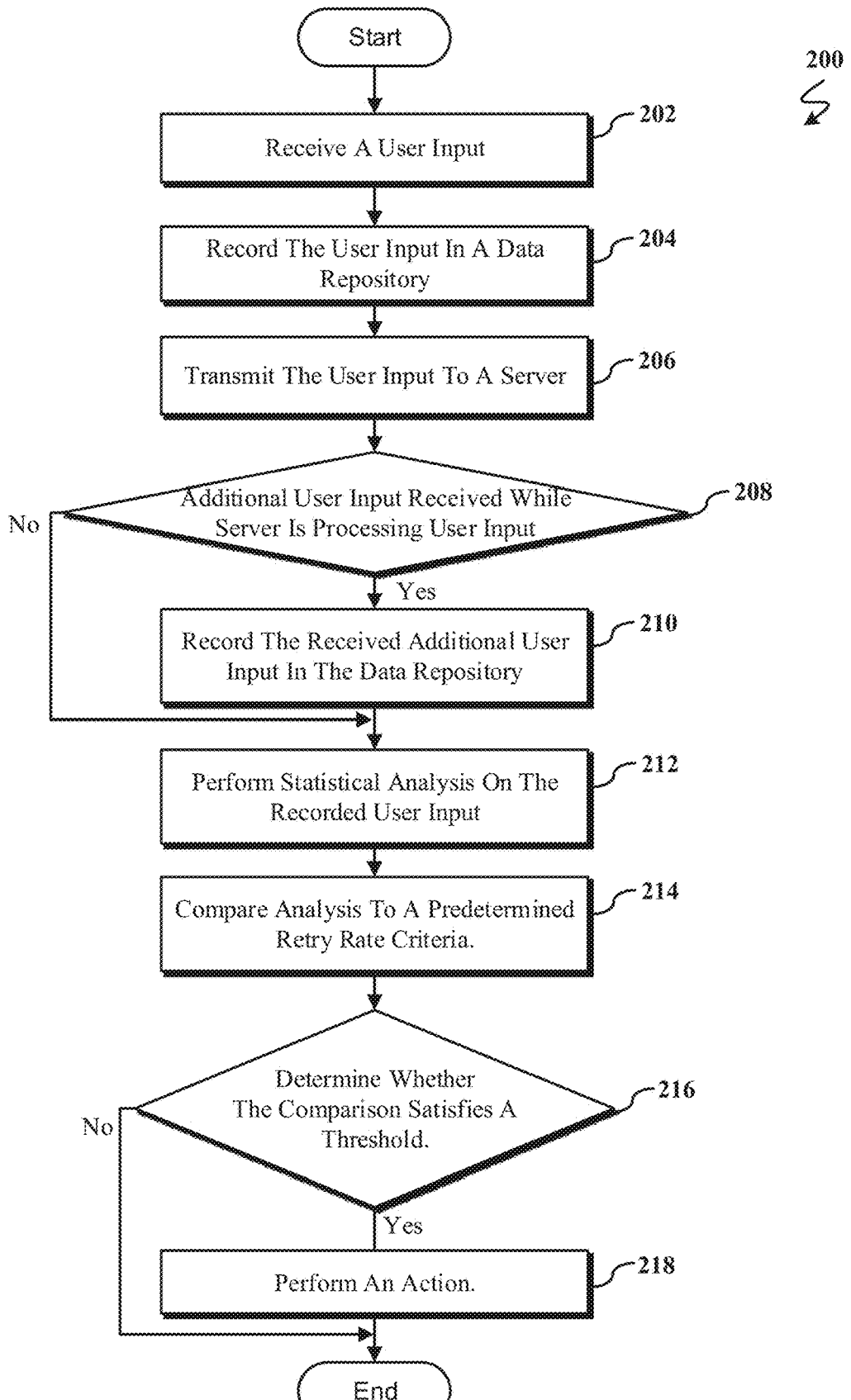
FIG. 2 illustrates an operational flowchart illustrating an example user interaction process by a user interaction program, according to at least one embodiment.

Referring now to FIG. 2, an operational flowchart illustrating the exemplary user interaction process 200 (e.g., executed by a processor running the user interaction program 110a and 110b shown in FIG. 1) according to at least one embodiment is depicted. At 202, the processor receives an initial user input. The received user input may have been inputted into an electronic device, such as a smart phone, tablet, laptop, smart TV, cellular device, or the like, to access a selection element. The received user input may have been a selection of an application (e.g., a calendar, a streaming service, or an internet browser). For example, the user may have selected a selection element within an application, such as a link within a calendar application, to load. The selection element may be any portion of an application that is accessible by a user. For example, the selection element may be any links, dropdown menu, area to input text, selectable graphical icons, transmit/receive buttons, buttons, etc. within an application.

At 204, the processor records the user input in a data repository (e.g., database 114). The processor may record the user input as a single count in a table or list designating the user input as an initial user input. The initial user input may be user input that is received prior to the server performing a request, or action, based on user input. The table or list stored in the database 114 may include rows and columns. The columns may include a first row for initial user input and a second row for additional user input. The additional user input may be user input received after the server starts performing a request, or action, based on the initial input. The rows may include a numerical value for the initial user input (e.g., one) and a numerical value for any additional user input (e.g., zero, ten, or fifteen). For example, in some embodiments the additional information may include, but is not limited to, a timestamp of when the user input was received, an identifier for the application or selection element, and/or a type of selection action (e.g., user input) performed by the user (e.g., single tap, tap and hold, double tap, etc.).

Next, at 206, the processor transmits the user input to a server (e.g., server 112). The server (e.g., server 112) may process the user input. For example, if the user input was a user clicking on an application's icon signaling to load an application, such as an internet browser, the server (e.g., server 112) may transmit an instance that is displayed within the user's electronic device. In some cases, the server may be busy processing multiple requests from other users, and the user input may be waiting on the multiple requests to be processed before the server may process the received initial user input. In this case, the user may grow impatient or believe that the initial user input was not received, which may lead to the user clicking on the application's icon multiple times while the server is processing the user input or multiple requests.

Then, at 208, the processor determines whether additional user input is received. If the processor determines additional user input is received (208, "YES" branch), the user interaction process 200 may record the additional user input in the data repository at 210. If the processor determines that no additional user input is received (208, "NO" branch), the user interaction process 200 may perform statistical analysis techniques on the recorded user input at 212.

If the processor determines additional user input is received, then, at 210, the processor records the received additional user input in the data repository (e.g., database 114). The processor may continuously check for additional user input until the server (e.g., server 112) processes the initial user input. The processor may record the additional user input in the data repository (e.g., database 114) after every detection of the additional user input. The numerical value for the additional user input in the table or list may be any positive numerical value. For example, the numerical value may be a count of how many additional inputs have been received past the first input.

Then, at 212, the processor performs statistical analysis on the recorded user input to determine one or more selection attempt values (e.g., click rate, total number of clicks, etc.). The statistical analysis may be performed utilizing known statistical analysis techniques, and may be performed on the table or list stored in the data repository (e.g., database 114). The statistical analysis techniques may include dividing the initial user input by the total of the initial user input and any additional user input, or counting the total number of user inputs. The statistical analysis techniques may also include adding all of the additional user input, or determining a ratio, that is the total amount of the initial user input divided by the total of the initial user input added to all of the additional user input. For example, in some embodiments the processor may determine a rate at which the user clicked the element (e.g., a number of clicks per second, also referred to herein as a click rate) over a predetermined period of time (e.g., after the server completed processing the input). In some embodiments, the processor may determine a click acceleration (e.g., a change in the click rate over a predetermined period of time).

The predetermined period of time may be any time period after the user first clicks the selection element. For example, the predetermined period of time may be a time period after the server has completed processing the input, but before corresponding actions (e.g., loading an application, displaying retrieved data, etc.) has been processed by the electronic device (e.g., the user's device). In other embodiments, the predetermined period of time may be a time period that begins once the user has clicked on a selection element for the first time, or once the user has clicked on a selection element a second time (e.g., at the first additional user input). In some embodiments, the predetermined period of time may be a rolling period. For example, the processor may look at all user input over the last 5 seconds, and the one or more selection attempt values may be determined based on those 5 seconds.

Then, at 214, the processor compares the analysis (e.g., the selection attempt value(s)) to a predetermined retry rate criteria. The predetermined retry rate criteria may be a user-defined policy, or an automated policy implemented by processor, that may control the number/rate at which the user may select the element before a corrective action is performed. The predetermined retry rate criteria may be any positive numerical value that is an acceptable value for a number of additional user inputs, or may be a ratio. For example, the ratio may be the total amount of the initial user input divided by the total of the initial user input added to all of the additional user input. For example, if the user attempted to select the element fifteen additional times after the initial user input, then the ratio would be one divided by the total of one plus fifteen, sixteen, equaling a sixteenth. The user can determine that fifteen attempts to load an application should be set as the limit, so he may set the predetermined rate criteria to fifteen. In some cases, the processor may automatically determine the ratio or positive numerical value. The determination may be based on historical data from a previous predetermined retry rate criteria, or based on manual determinations made by the user or by the developer of the user interaction program 110a and 110b.

Then, at 216, the processor determines whether the comparison satisfies threshold based on the comparison. If the processor determines the comparison satisfies the threshold (216, "YES" branch), the user interaction process 200 may perform an action at 218. Satisfying the threshold could include a value determined by the analysis is greater than or equal to a predetermined rate criteria value. The analysis value may be the value of the ratio or a total number of counts of user input. For example, if the user initially selected an application once and then additionally selected the application ten times, the analysis value would be eleven times. Continuing the example, if the predetermined retry rate criteria value is ten, then the comparison satisfies the threshold, because eleven is greater or equal to ten. Additionally, if the ratio is twelve and the predetermined retry rate criteria is nine, then the comparison satisfies the threshold, because twelve is greater than or equal to nine. If the processor determines the comparison does not satisfy the threshold (216, "NO" branch), the user interaction process 200 may terminate.

In some embodiments, the predetermined retry rate criteria may include two or more criterion. Each criterion may correspond to a particular selection attempt value. For example, a first criterion may be a maximum number of times the selection element can be clicked before a notification is provided or the selection element is locked. A second criterion may be a maximum click rate (e.g., number of times the user can click the selection element before it is locked). The processor may compare each criterion to its corresponding selection attempt value to determine whether the comparison satisfies the threshold. In some embodiments, the comparison satisfies the threshold if any one of the selection attempt values exceeds its corresponding threshold. In other embodiments, the comparison satisfies the threshold only if every one of the selection attempt values exceeds its corresponding threshold. In some embodiments, the comparison satisfies the threshold if a certain percentage (e.g., 50%) of the one of the selection attempt values exceeds its corresponding threshold.

If the processor determines the comparison satisfies the threshold, then, at 218, the processor performs an action. In some embodiments, the performed action may be an automatic update to the application noting that the application is loading. The action may be an automatically generated instance, generated by the processor that is displayed within the user interface of the electronic device. The automatically generated instance may be a comment, such as "Content is loading. Your patience is appreciated," or may be any comment and/or digital image that represents a note that the content is loading and/or is being processed by the server. In some embodiments, the action may be deactivating the element the user is attempting to select. For example, the element may not be selectable for a predetermined period (e.g., twenty seconds, two minuses, etc.) in order to give the processor a chance to complete the selected task. In some embodiments, the count may be reset. In some embodiments, the action performed may be generating a customizable dashboard to be transmitted to the application owner, discussed in further detail with reference to FIG. 3. In some embodiments, the action may be automatically or manually performed, either by the processor or user, respectfully, and may be based on the application or type of application. For example, automatically performing the action may be in response to a user repeatedly attempting to load an internet browser, and manually performing the action may be in response to the user repeatedly attempting to load a streaming video application.

In some embodiments, each retry rate criterion may have a corresponding action that is performed if the particular retry rate criterion exceeds its corresponding threshold. For example, the retry rate criteria may include a first criterion that sets the maximum number of times the selection element can be clicked and a second criterion that sets the maximum click rate. If, at 216, the processor determines that a selection attempt value exceeds the first criterion, the processor may generate a prompt informing the user that the content is loading. If, however, the processor determines that a selection attempt value corresponding to the second criterion exceeds the second criterion, the processor may deactivate the selection element that the user is repeatedly clicking for a period of time (e.g., 10 seconds). The processor may additionally generate a prompt informing the user that the selection element is disabled. Once the action is performed at 218, the user interaction process 200 may terminate.

Figure 3:
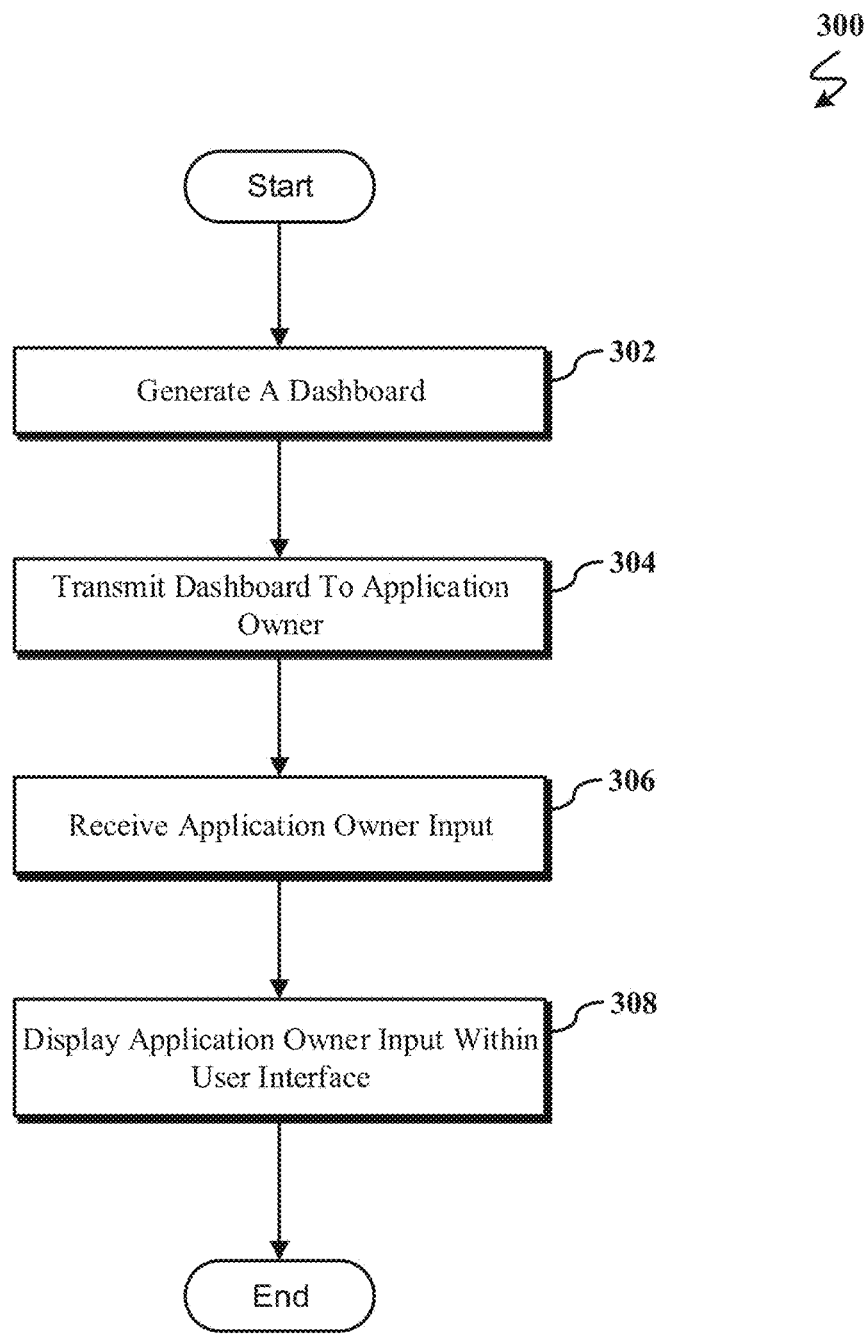
FIG. 3 illustrates an operational flowchart illustrating an example dashboard generation process by a user interaction program, according to at least one embodiment.

Referring now to FIG. 3, an operational flowchart illustrating an exemplary dashboard generation process 300 (e.g., performed by a processor executing the user interaction program 110a and 110b shown in FIG. 1) according to at least one embodiment is depicted. At 302, the processor generates a dashboard, discussed in further detail with reference to FIG. 4. The generated dashboard may be automatically generated in response to the threshold being satisfied at step 216. The dashboard may be customized by the user, an owner or the application, or a developer. The dashboard may include a list of all applications running on a particular user's electronic device and/or all applications that developer is working on, including users that are utilizing the applications. The dashboard may include the table or list that includes a numerical value for the initial user input and a numerical value for the additional user inputs, and may include all the statistical analysis performed, including a calculated ratio. Additionally, the dashboard may include whether each application depicted is generating a positive user interaction or a negative user interaction, and the degree of the negative interaction. A positive user interaction indicates that no selection attempts inputted by the user have been received after the server has begun processing the initial user input, and a negative user interaction indicates that at least one selection attempt (i.e., additional user input) has been received after the server has begun processing the initial input. Additionally, the dashboard may include functionality that includes an option that automatically sends a command (e.g., code) that causes the user's device to react (e.g., block additional selections of a particular element for a predetermined amount of time).

At 304, the processor transmits an electrical representation of the dashboard to an application owner. The application owner may receive the dashboard and decide whether to transmit a message or graphical icon to the user, making the user aware that the application is loading and the server is processing his (the user's) request. The application owner may also customize or design the dashboard according to his preferences. The dashboard may include one or more negative user interactions from a previous time interval, for example three minutes or any positive number, and he may decide to send one or more messages or graphical icons, notifying the one or more users that the application is loading and server(s) are processing their requests. The dashboard may also include a refresh button that refreshes all the user interactions for all applications, or may update the dashboard in real time.

At 306, the processor receives an application owner's input. The application owner's input may be a comment that the application owner would like to be presented on a display of the user's electronic device; the comment is discussed in further detail with reference to FIG. 5. In some embodiments, the dashboard may be a graphical user interface (GUI) that is customizable, with functionality that allows an application owner to create a graphical icon to notify the user that the user input is being processed by a server. The created graphical icon may be recorded in a data repository (e.g., database 114) that the application owner can access for selection; the database 114 may include a plethora of previously created graphical icons available for selection by the user. The graphical icon may be recorded in the database with a tag that may be organized according to user preferences or to application configurations.

At 308, the processor displays the application owner's input within a user interface of the electronic device. A view of the display from a user's perspective is discussed in detail with reference to FIG. 5. The graphical icon within the display may include functionality that allows the user to be in communication with the application owner for direct feedback or questioning. For example, the graphical icon may have a link or area open for the user to input questions or communication in the form of text that causes, when the link is selected or the text is inputted, a generated direct communication feed with the application owner or a representative who has knowledge of the application for customer feedback to be utilized. The graphical icon may also include a link or icon of a telephone that automatically contacts the developer or application owner for instant live communication; the communication may be over oral or live video.

Figure 4:
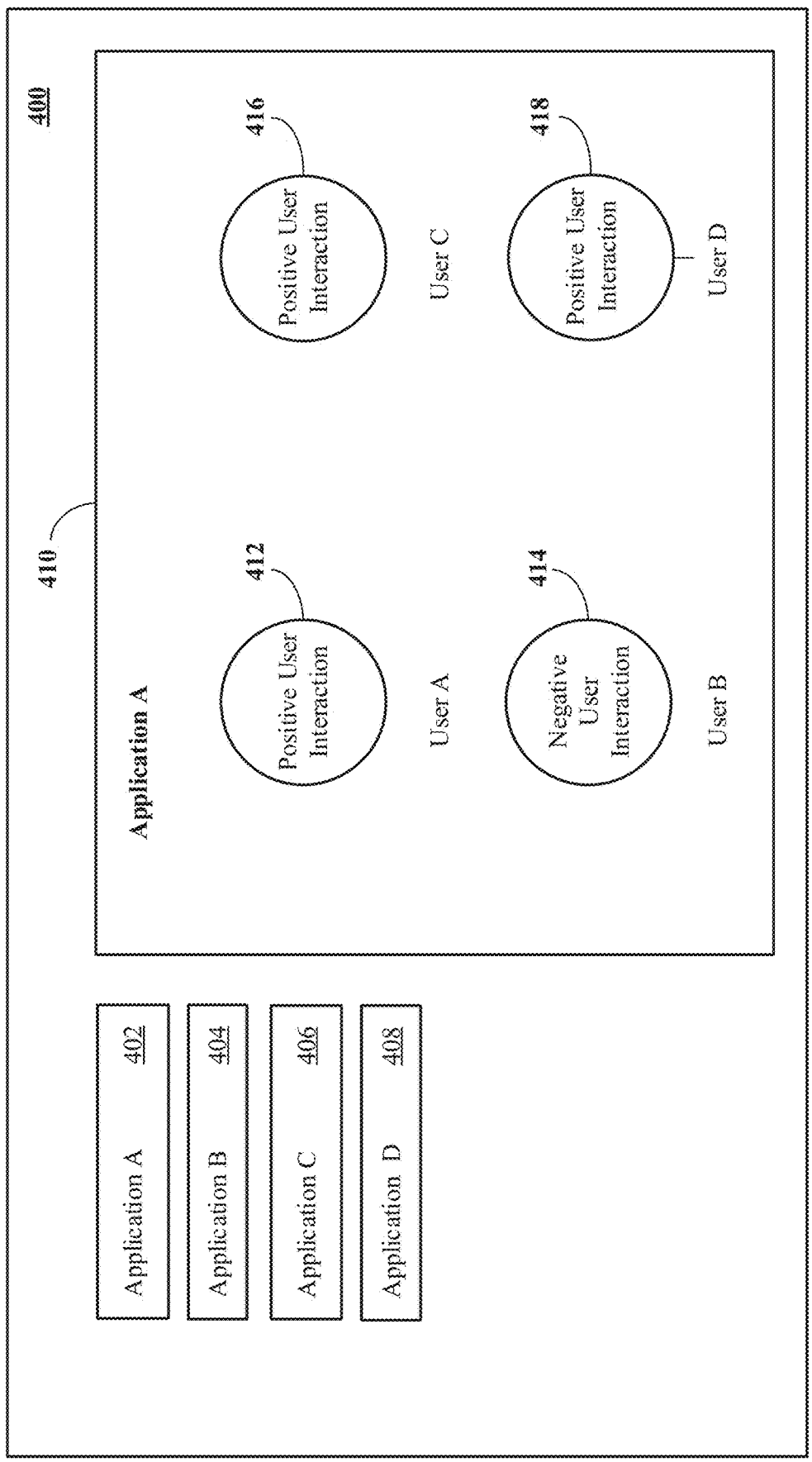
FIG. 4 illustrates an exemplary diagram of a system generated dashboard, according to at least one embodiment.

FIG. 4 illustrates an exemplary dashboard 400, in accordance with embodiments of the present disclosure. The exemplary dashboard 400 may include applications A-D (402-408). A digital representation of application A 410 may display all the users currently utilizing application A 402, and include all of the users' interactions 412-418. An application owner may select, by clicking or giving an auditory command, a user interaction, for example, user interaction of user B 414 that is displayed as a negative user interaction, to send a message or graphical icon to display within user B's electronic device. In some embodiments, the dashboard may be customizable, and include more functionality than what is depicted in exemplary dashboard 400. For example, the dashboard may include a section that displays the results of any statistical analysis techniques performed, such as a ratio of the initial user input divided by the initial user input added to the additional user input, and/or the total number of additional user input. For example, if the user attempted to select the element fifteen additional times after the initial user input, then the ratio would be one divided by the total of one plus fifteen, sixteen, equaling a sixteenth. The statistical analysis results may be included in each representation of the user interactions 412-418.

Figure 5:
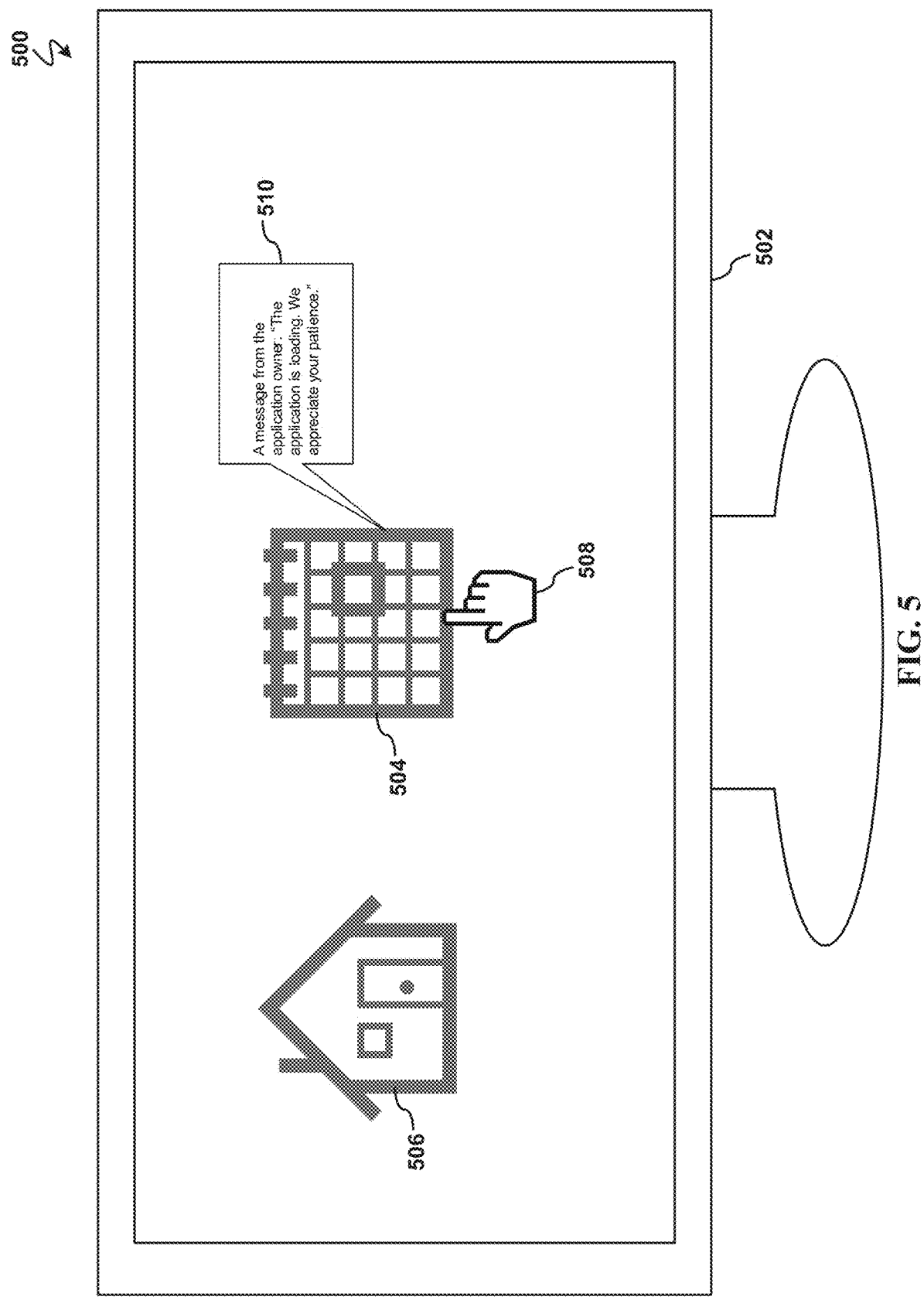
FIG. 5 illustrates an exemplary diagram of a graphical icon transmitted for display within a user interface, according to at least one embodiment.

FIG. 5 illustrates an exemplary display generation 500, in accordance with embodiments of the present disclosure. An electronic device 502 that includes a GUI, displaying the application 504 (e.g., a calendar application) that is being selected with a cursor 508. The GUI is also a home application 506. A digital message 510 that may have been designed manually by the application owner or automatically by the processor executing the user interaction program 110a and 110b, based on historical data specific to the user or based on messages or graphical icons previously generated by the application owner, is displayed within the GUI of the electronic device 502. The digital message is notifying the user that the initial user input is being processed by a server or computing device and the user's patience is appreciated. In some embodiments, the user may click on the digital message 510 with the cursor 508 and a live action feed may be displayed, allowing the user to communicate directly with the application owner. In some embodiments, the digital message may include a section for the user to input any questions in the form of text to be sent to the application owner. In some embodiments, the application 504 (e.g., the calendar application) may be blocked from additional clicks, but the another application (e.g., the home application 506 or multiple applications) may be clickable/selectable. The user or the developer may have selected an option to block the application 504 from additional clicks, or the application 504 may have been automatically blocked when the application 504 was selected over a certain amount of times. For example, the user clicked the application 504 over thirty times. In some embodiments, in order to decrease potential network traffic the user interaction program 110a and 110b may determine that an application (e.g., application 506), if clicked, will substantially increase network traffic. If this happens, the application may also be blocked from additional clicks, in addition to the application 504 being blocked.

It may be appreciated that FIGS. 2, 3, 4, and 5 provide only an illustration of one embodiment and do not imply any limitations with regard to how different embodiments may be implemented. Many modifications to the depicted embodiment(s) may be made based on design and implementation requirements.

Figure 6:
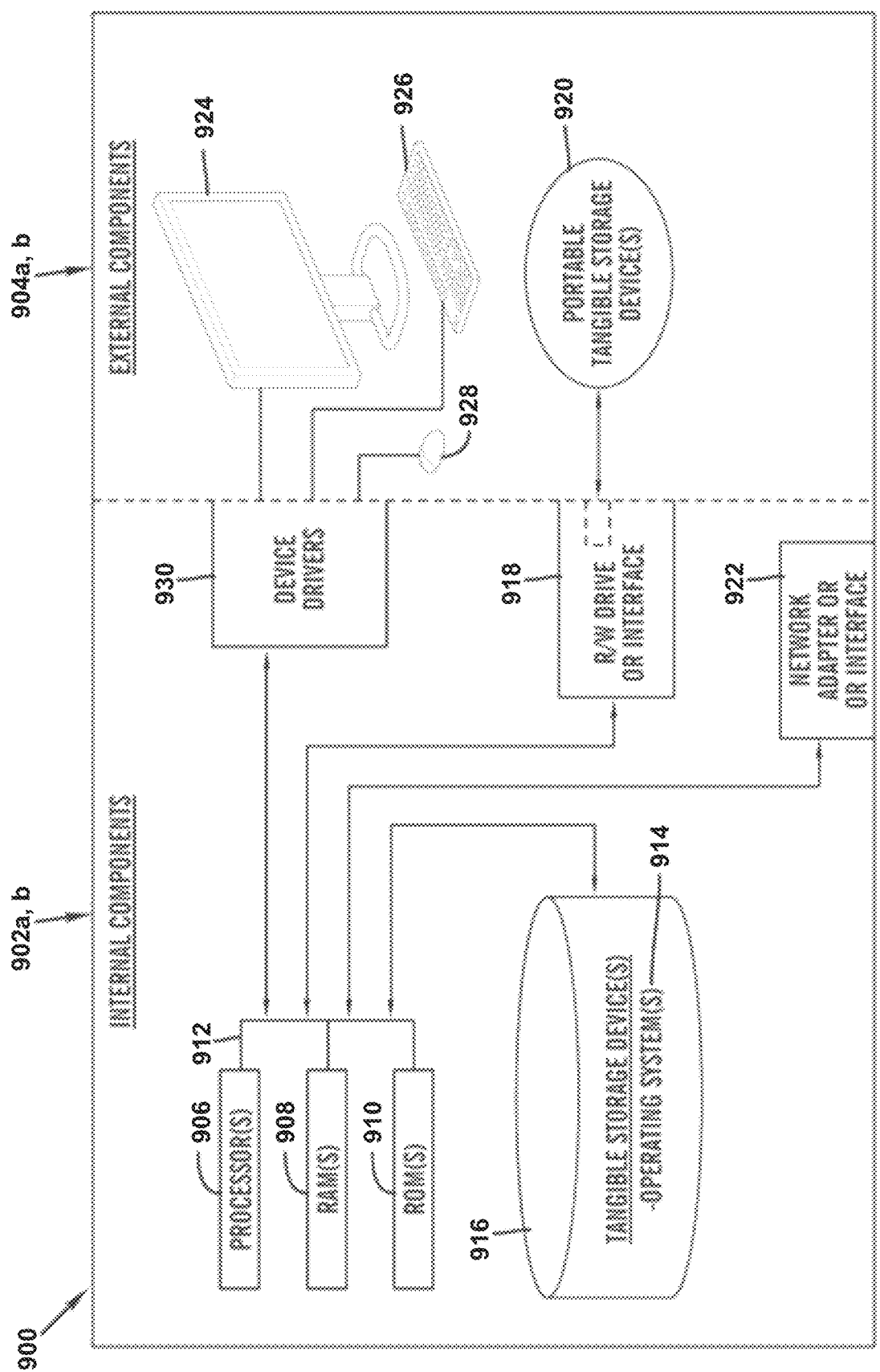
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902a, b, and 904, b is representative of any electronic device capable of executing machine-readable program instructions. Data processing system 902a, b, and 904, b may be representative of a smart phone, a computer system, PDA, or other electronic devices. Examples of computing systems, environments, and/or configurations that may represented by data processing system 902a, b, and, 904 a, b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 902 a, b and external components 904 a, b illustrated in FIG. 6. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914 and the software program 108 (FIG. 1) and the user interaction program 110a (FIG. 1) in client computer 102 (FIG. 1) and the user interaction program 110b (FIG. 1) in network server 112 (FIG. 1), may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 (FIG. 1) and the processor can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 (FIG. 1) and the user interaction program 110*a* (FIG. 1) in client computer 102 (FIG. 1) and the user interaction program 110*b* (FIG. 1) in network server computer 112 (FIG. 1) can be downloaded from an external computer (e.g., server) via a network (for example, the Internet, a local area network or other, wide area network) and respective network adapters or interfaces 922. From the network adapters (or switch port adaptors) or interfaces 922, the software program 108 (FIG. 1) and the user interaction program 110*a* (FIG. 1) in client computer 102 (FIG. 1) and the user interaction program 110*b* (FIG. 1) in network server computer 112 (FIG. 1) are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926, and computer mouse 928. The device drivers 930, R/W drive or interface 918 and network adapter or interface 922 comprise hardware and software (stored in tangible storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
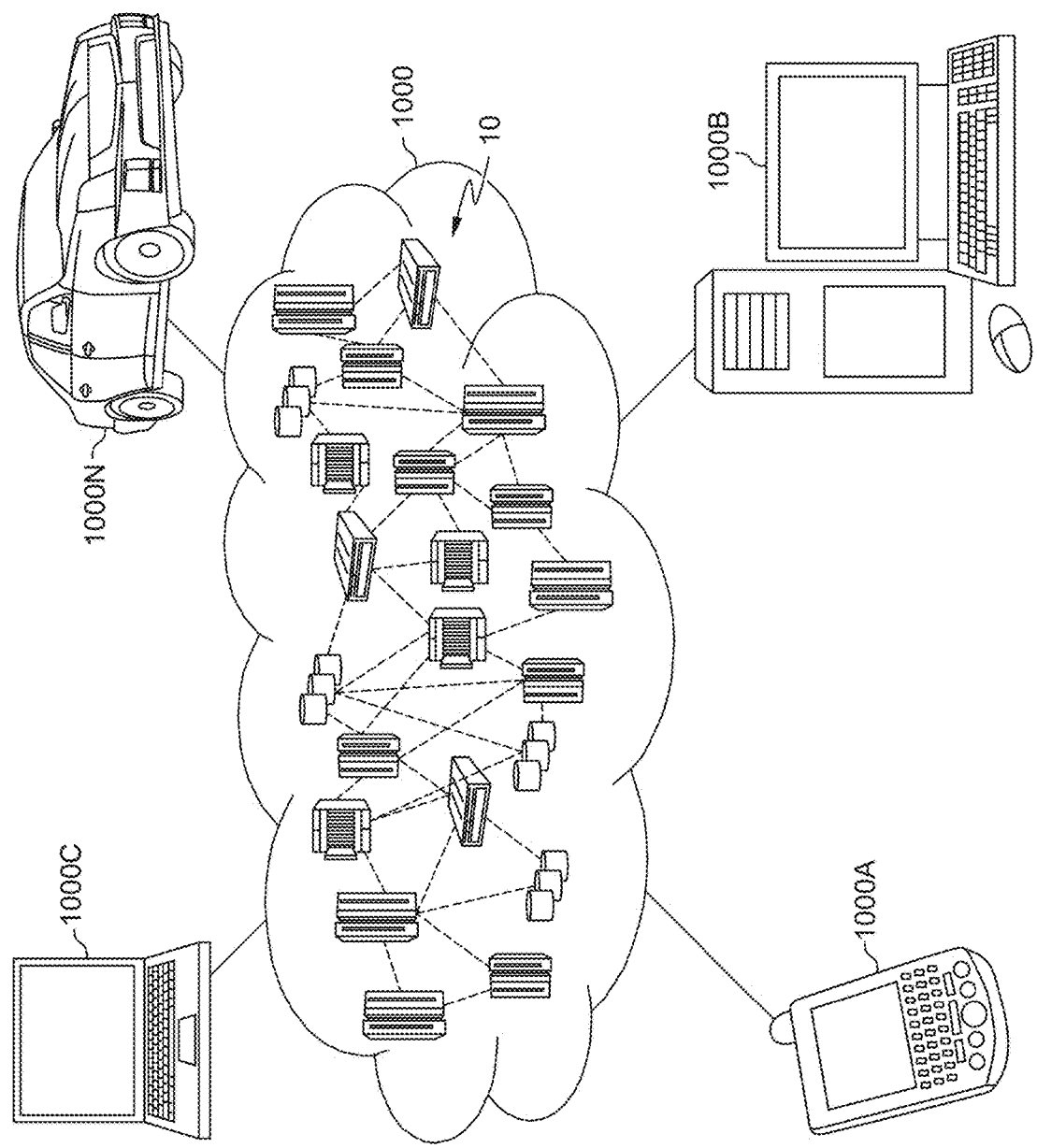
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 10 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 10 and cloud computing environment 1000 can communicate with any type of computerized device over any type of network and/or network addressable connection (e.g., using a web browser).

Figure 8:
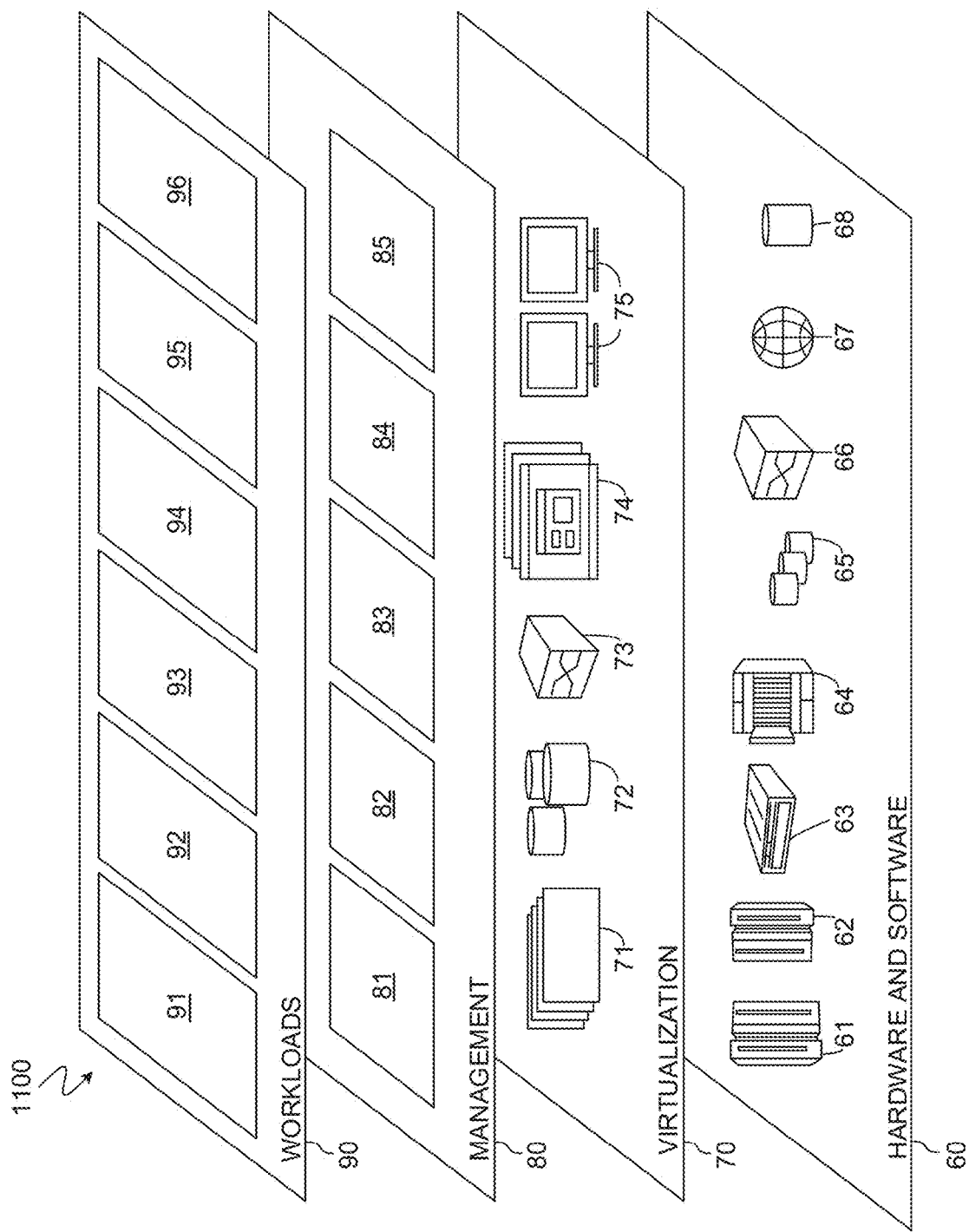
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and loading time detection 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically identifying a long loading time for a user selection, comprising:
   receiving an initial user input against a selection element for an application running on an electronic device;
   transmitting the initial user input to a server for processing the initial user input;
   receiving, after transmitting the initial user input to the server, one or more additional user inputs against the selection element;
   determining a selection attempt value based, at least in part, on the number of additional user inputs received;
   comparing the selection attempt value to a retry rate criteria, the retry rate criteria including a threshold; and
   performing an action in response to determining that the selection attempt value exceeds the threshold, wherein performing the action comprises disabling the selection element.

2. The method of claim 1, wherein the performed action further includes:
   generating an automatic notification; and
   displaying, based on the application and further according to historical data and user preferences, the generated notification within a user interface of the electronic device.

3. The method of claim 1, wherein the selection attempt value is a total number of user inputs, wherein the threshold is automatically determined based on historical data from previous recorded user input, the method further comprising:
   recording the initial user input and the one or more additional user inputs within a data repository.

4. The method of claim 1, further comprising:
   generating a dashboard that is based on the application in response to the selection attempt value satisfying the threshold;
   transmitting the generated dashboard to a developer;
   receiving developer input; and
   displaying the developer input within a user interface of the electronic device.

5. The method of claim 4, wherein the selection attempt value is a rate at which user inputs against the selection element have been received over a predetermined period of time, and wherein the threshold is a maximum user input rate, and wherein the performed action is performed in response to the rate exceeding the maximum user input rate.

6. The method of claim 1, wherein:
   the retry rate criteria includes a plurality of thresholds;
   determining the selection attempt value includes determining a plurality of selection attempt values, each respective selection attempt value corresponding to a different threshold of the plurality of thresholds; and comparing the selection attempt value to the retry rate criteria includes comparing each of the plurality of selection attempt values to its corresponding threshold.

7. The method of claim 6, wherein each threshold of the plurality of thresholds has a corresponding action, and wherein performing the action further comprises:
   determining that a first selection attempt value of the plurality of selection attempt values exceeds a first threshold of the plurality of thresholds, the first selection attempt value being associated with the first threshold;
   determining a first action that is associated with the first threshold; and
   performing the first action.

8. A computer system automatically identifying a long loading time for a user selection, comprising:
   a memory; and
   a processor communicatively coupled to the memory, wherein the processor is configured to perform a method comprising:
   receiving an initial user input against a selection element of a graphical user interface (GUI) for an application running on an electronic device;
   transmitting the initial user input to a server for processing the initial user input;
   receiving, after receiving the initial user input, one or more additional user inputs against the selection element;
   determining a selection attempt value based, at least in part, on the number of additional user inputs received;
   comparing the selection attempt value to a retry rate criteria, the retry rate criteria including a threshold; and
   performing an action in response to determining that the selection attempt value exceeds the threshold, wherein performing the action comprises disabling the selection element.

9. The system of claim 8, wherein the selection attempt value is a total number of user inputs, wherein the threshold is automatically determined based on historical data from previous recorded user input, and wherein the method further comprises:
   recording the initial user input and the one or more additional user inputs within a data repository.

10. The system of claim 8, wherein the method further comprises:
    generating a dashboard that is based on the application in response to the selection attempt value satisfying the threshold;
    transmitting the generated dashboard to a developer;
    receiving developer input; and
    displaying the developer input within a user interface of the electronic device.

11. The system of claim 10, wherein the selection attempt value is a rate at which user inputs against the selection element have been received over a predetermined period of time, and wherein the threshold is a maximum user input rate, and wherein the performed action is performed in response to the rate exceeding the maximum user input rate.

12. The system of claim 8, wherein:
    the retry rate criteria includes a plurality of thresholds;
    determining the selection attempt value includes determining a plurality of selection attempt values, each respective selection attempt value corresponding to a different threshold of the plurality of thresholds; and
    comparing the selection attempt value to the retry rate criteria includes comparing each of the plurality of selection attempt values to its corresponding threshold.

13. The system of claim 12, wherein each threshold of the plurality of thresholds has a corresponding action, and wherein performing the action further comprises:
    determining that a first selection attempt value of the plurality of selection attempt values exceeds a first threshold of the plurality of thresholds, the first selection attempt value being associated with the first threshold;
    determining a first action that is associated with the first threshold; and
    performing the first action.

14. A computer program product comprising a computer readable storage medium having program instructions embodied therewith, the program instructions executable by a processor to cause the processor to perform a method comprising:
    receiving an initial user input against a selectable graphical user interface (GUI) element for an application running on an electronic device;
    transmitting the initial user input to a server;
    receiving, after receiving the initial user input, one or more additional user inputs against the selectable GUI element;
    determining a selection attempt value based, at least in part, on the one or more additional user inputs; and
    performing an action in response to determining that the selection attempt value exceeds a retry criteria, wherein performing the action comprises disabling the selection element.

15. The computer program product of claim 14, wherein performing the action further includes updating the application to indicate that the selectable GUI element is loading.

16. The computer program product of claim 14, wherein the selection attempt value is a total number of user inputs, wherein the retry criteria is automatically determined based on historical data from previous recorded user input, and wherein the method further comprises:
    recording the initial user input and the one or more additional user inputs within a data repository.

17. The computer program product of claim 14, wherein:
    the retry criteria includes a plurality of thresholds;
    determining the selection attempt value includes determining a plurality of selection attempt values, each respective selection attempt value corresponding to a different threshold of the plurality of thresholds; and
    comparing the selection attempt value to the retry criteria includes comparing each of the plurality of selection attempt values to its corresponding threshold.

18. The computer program product of claim 17, wherein each threshold of the plurality of thresholds has a corresponding action, and wherein performing the action further comprises:
    determining that a first selection attempt value of the plurality of selection attempt values exceeds a first threshold of the plurality of thresholds;
    determining a first action that is associated with the first threshold; and
    performing the first action.

* * * * *